(12) United States Patent
Cho (10) Patent No.: US 7,136,569 B2
(45) Date of Patent: Nov. 14, 2006

(54) COMBINATION SYSTEM HAVING A PLURALITY OF REPRODUCING APPARATUSES AND A METHOD FOR CONTROLLING OPERATION THEREOF

(75) Inventor: Byung-hyuk Cho, Suwon (KR)

(73) Assignee: Samsung Electronics Co., LTC., Suwon (KR)

( * ) Notice: Subject to any disclaimer, the term of this patent is extended or adjusted under 35 U.S.C. 154(b) by 351 days.

(21) Appl. No.: 10/389,900

(22) Filed: Mar. 18, 2003

(65) Prior Publication Data

US 2003/0194201 A1    Oct. 16, 2003

(30) Foreign Application Priority Data

Apr. 11, 2002    (KR)    ................. 2002-19691

(51) Int. Cl.
*H04N 5/76*    (2006.01)
(52) U.S. Cl. ........................................ 386/46; 386/125
(58) Field of Classification Search ................. 386/94, 386/46, 12, 126, 125
See application file for complete search history.

(56) References Cited

U.S. PATENT DOCUMENTS

| 4,337,480 | A | 6/1982 | Bourassin et al. |
| 5,915,206 | A | 6/1999 | Diehl et al. |
| 6,349,352 | B1 * | 2/2002 | Lea ............................. 710/72 |
| 2003/0206711 | A1 * | 11/2003 | Berkheimer et al. .......... 386/46 |

FOREIGN PATENT DOCUMENTS

| EP | 0 471 615 A2 | 2/1992 |
| EP | 0 507 433 A1 | 10/1992 |
| EP | 0 725 491 A2 | 8/1996 |
| JP | 7312071 | 11/1995 |

* cited by examiner

*Primary Examiner*—Thai Tran
*Assistant Examiner*—Jamie Vent

(57) ABSTRACT

A combination system including a plurality of reproducing apparatuses, such as a digital versatile disk player (DVDP) and a video cassette recorder, and a method for controlling operation of the same. The combination unit includes a selecting unit for selecting a reproduced signal provided by one of the plurality of reproducing apparatuses that is switched to a play mode, a selection information storing unit for storing selection information identifying the reproducing apparatus that outputs the reproduced signal selected by the selecting unit, and a control unit for controlling the reproducing apparatus to switch to a pause mode or a stop mode when the selection information stored in the selection information storing unit changes from identifying the reproducing apparatus to identifying another reproducing apparatus of the plurality of reproducing apparatuses. The control unit can be disposed in one of the plurality of the reproducing apparatuses, and can control that reproducing apparatus to switch from the pause mode into the stop mode when the selection information stored in the selection information storing unit is not changed for a predetermined time period. Accordingly, the operability of the combination system improves, while undesired power consumption due to unnecessary reproducing operation of the reproducing apparatus can be prevented.

16 Claims, 6 Drawing Sheets

DO YOU WANT TO STOP DVDP?

YES

NO o o o o o

COMBINATION SYSTEM HAVING A PLURALITY OF REPRODUCING APPARATUSES AND A METHOD FOR CONTROLLING OPERATION THEREOF

This application claims benefit under 35 U.S.C. § 119 from Korean Patent Application No. 2002-19691, filed on Apr. 11, 2002, the entire content of which is incorporated herein by reference.

BACKGROUND OF THE INVENTION

1. Field of the Invention

The present invention relates to a system and method for combining a plurality of reproducing apparatuses in a single unit. More particularly, the present invention relates to a system for combining a plurality of devices, such as digital versatile disk players and videocassette recorders, in a single unit, and a method for controlling operation of the same.

2. Description of the Related Art

Figure 1:
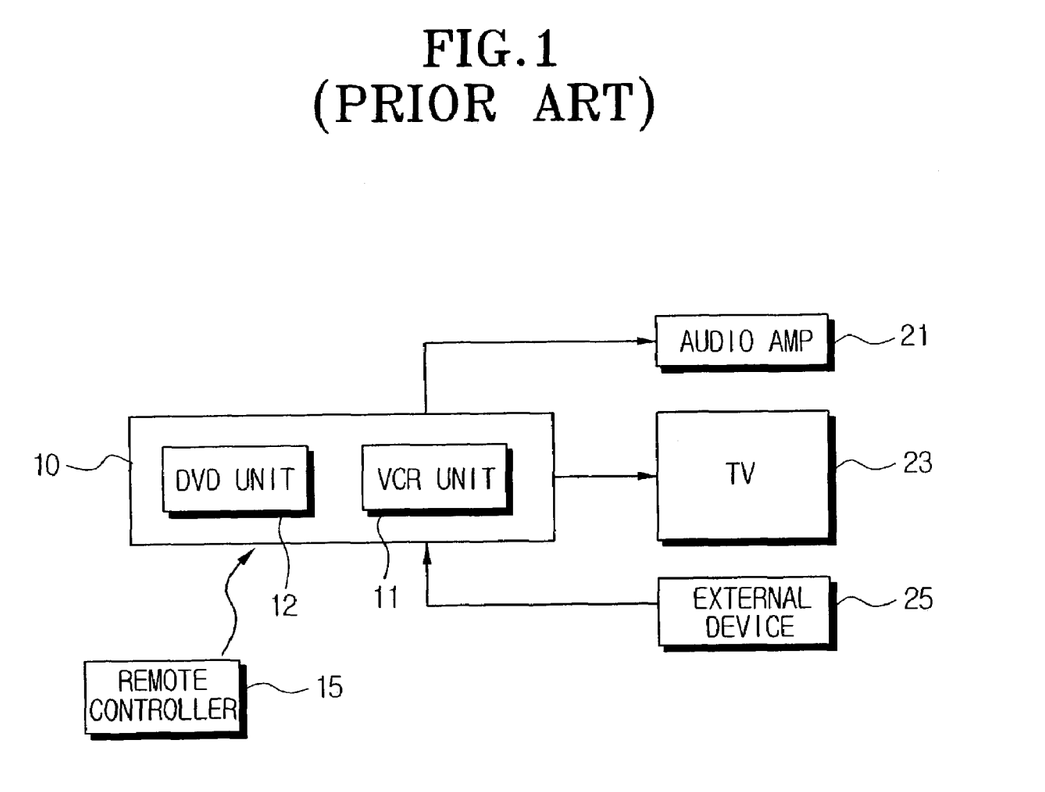
FIG. 1 is a schematic block diagram of a conventional combined DVDP/VCR system.

FIG. 1 shows a combined DVDP/VCR system 10 and its associated peripherals connected. The combined DVDP/VCR system 10 has a video cassette recorder (VCR) unit 11 for performing functions of the VCR such as reproducing video and audio from a magnetic tape and recording an externally received signal onto the magnetic tape, and a digital versatile disk player (DVDP) unit 12 for performing functions of the DVDP such as reproducing video and audio from a DVD. In addition to the separate functions of the VCR unit 11 and the DVDP unit 12, the combined DVDP/VCR system 10 also has the combined functions such as recording the video and audio reproduced from the DVDP unit 12 onto the magnetic tape by the VCR unit 11.

The combined DVDP/VCR system 10 is connected to a television 23 for outputting the video and audio reproduced from the DVDP unit 12 or from the VCR unit 11, and is also connected to an audio amp 21 for outputting the audio signal reproduced from the DVDP unit 12. In addition, the combined DVDP/VCR system 10 can be connected to external devices 25 such as a camcorder, and therefore, the combined DVDP/VCR system 10 performs recording and reproducing of the video and audio input from the external devices 25.

The VCR unit 11 and the DVDP unit 12 of the combined DVDP/VCR system 10 are constructed as one system. Hence, a user can switch the modes of the VCR unit 11 and the DVDP unit 12, and manipulate the respective functions of the VCR unit 11 and the DVDP unit 12 by manipulating a separate input device such as a remote controller 15, or by manipulating an operational panel (not shown) provided with the combined DVDP/VCR system 10.

In the conventional combined DVDP/VCR system 10 constructed as described above, video and audio signals are output through a display unit (e.g., television) by a reproducing operation performed by the VCR unit 11 or the DVDP unit 12. When one of the units 11 or 12 is performing a reproducing operation and the user wants the other unit 11 or 12 to perform the reproducing operation instead, he or she has to switch the play mode of the reproducing unit 11 or 12 to a stop mode, and then switch the mode of the other unit 11 or 12 to the play mode, which is quite complicated.

Japanese Patent No. 7-312071 to Matsushita Electric Ind. Co., Ltd., the entire contents of which is incorporated by reference herein, discloses a Reproducing device which includes a combination apparatus having improved operability, in an attempt to solve the above problems.

Figure 2:
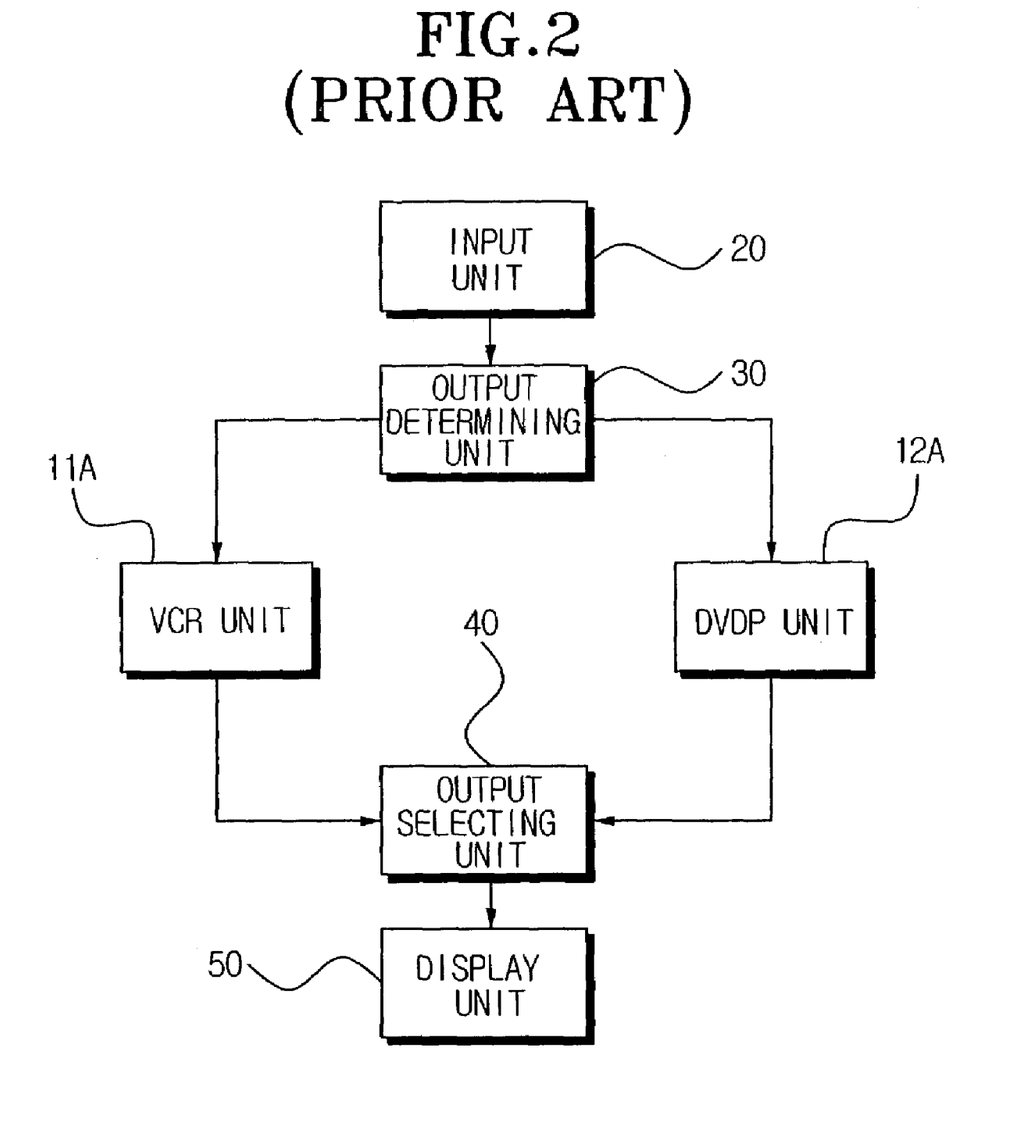
FIG. 2 is a block diagram of a combined DVDP/VCR as described in Japanese Patent No. 7-312071.

FIG. 2 shows the reproducing device disclosed in JP 7-312071, which includes a VCR unit 11A, a DVDP unit 12A, an input unit 20 for selecting the VCR unit 11A or the DVDP unit 12A to operate in a play mode, and an output determining unit 30 for controlling the selected unit 11A or 12A to operate in the play mode. The reproducing device further includes an output selecting unit 40 for selecting the VCR unit 11A or the DVDP unit 12A to operate in the play mode under the control of the output determining unit 30, and a display unit 50 for displaying an output signal reproduced by the unit 11A or 12A that is selected by the output selecting unit 40.

For example, when the user inputs a VCR reproducing command through the input unit 20 during the reproducing operation of the DVDP unit 12A, the output determining unit 30 controls the VCR unit 11A to perform a reproducing operation, while controlling the DVDP unit 12A to stop the reproducing operation. The output selecting unit 40 selects the output signal reproduced from the VCR unit 11A and outputs the selected output signal to the display unit 50.

In other words, the device disclosed in JP 7-312071 provides improved operability for the case where the user inputs through the input unit 20 a command for reproducing operation of the other unit during the reproducing operation of one unit, by preferentially switching the mode of the other unit into a play mode and outputting the reproduced signal through the display unit 50.

The combination apparatus disclosed in JP7-312071 also provides improved operability, especially when the unit is made to switch to the play mode through the input unit 20. However, the improvement in operability does not occur when the unit is made to switch to the play mode upon insertion of a recording medium, namely, a video tape or DVD, into a deck (not shown).

For example, in the case where the DVDP unit 12A is switched to the play mode due to insertion of the DVD in the deck when a reproducing operation is being performed by the VCR unit 11A, the output determining unit 30 cannot determine whether the DVDP unit 12A is switched to the play mode or not, and accordingly, the VCR unit 11A keeps operating in the play mode. Therefore, the user has to separately input the stop command for the DVDP unit 12A through the input unit 20, or stop the operation of the DVDP unit 12A by taking the DVD out of the deck.

Furthermore, when the user needs to switch the DVDP unit 12A to the play mode to search the recorded contents on the DVD when a reproducing operation is being performed by the VCR unit 11A, the user has to switch the VCR unit 11A to the stop mode, and then switch the DVDP unit 12A to the play mode. The user also has to switch the VCR unit 11A back to the play mode after the completion of search, which results in inconvenience for the user.

SUMMARY OF THE INVENTION

Accordingly, it is an object of the present invention to provide a combination system having a plurality of reproducing apparatuses, and a method for controlling the operation of the system, which provide an improved reliability and convenience in operation by a user.

The above object is substantially accomplished by a combination system having a plurality of reproducing apparatuses according to an embodiment of the present invention. The system employs a selecting unit for selecting a reproduced signal from one of the plurality of reproducing apparatuses that is switched to a play mode, a selection information storing unit for storing selection information identifying the reproducing apparatus that outputs the reproduced signal selected by the selecting unit, and a control unit for controlling that reproducing apparatus to switch to either a pause mode or a stop mode when the selection information stored in the selection information storing unit changes from identifying that reproducing apparatus to identifying another reproducing apparatus of the plurality of reproducing apparatuses.

The control unit can be provided in one of the plurality of reproducing apparatuses, such as the VCR, and controls that reproducing apparatus to switch from the pause mode to a play mode when the selection information stored in the selection information storing unit is not changed for a predetermined time period.

The plurality of reproducing apparatuses comprise a digital versatile disk player (DVDP) for reproducing recorded data in a digital versatile disk (DVD), and a videocassette recorder (VCR) for reproducing recorded data in a magnetic tape. The system further employs an on-screen display (OSD) unit for generating a selection menu in the form of an OSD screen which pertains to the operational mode of the one of the plurality of reproducing apparatuses when the selection information stored in the selection information storing unit is changed.

The above object is also substantially accomplished by a method for controlling an operation of a combination system having a plurality of reproducing apparatuses according to an embodiment of the present invention. The method includes the steps of selecting a reproduced signal of one of the plurality of reproducing apparatuses that is switched to a play mode, storing a selection information identifying the apparatus that outputs the selected reproduced signal, and controlling that reproducing apparatus to switch into either a pause mode or a stop mode when the selection information stored in the selection information storing unit has changed from identifying that reproducing apparatus to identifying another of the plurality of reproducing apparatuses.

The controlling step further switches one of the plurality of reproducing apparatuses from the pause mode to a stop mode when the stored selection information is not changed for a predetermined time period.

The method further includes a step of displaying the selection menu pertaining to the operational mode of the one of the plurality of reproducing apparatuses in the format of an on-screen display (OSD) when the selection information stored in the selection information storing unit is changed from identifying one of the plurality of reproducing apparatuses to identifying another of the plurality of reproducing apparatuses.

Accordingly, the operability of the combination system is improved, and power consumption due to unnecessarily operating the reproducing apparatuses can be prevented.

BRIEF DESCRIPTION OF THE DRAWINGS

The above-mentioned objects and the feature of the present invention will be more apparent by describing a preferred embodiment of the present invention in detail referring to the appended drawings, in which.

DETAILED DESCRIPTION OF THE PREFERRED EMBODIMENT

An embodiment of the present invention will be described in greater detail with reference to the accompanying drawings.

Figure 3:
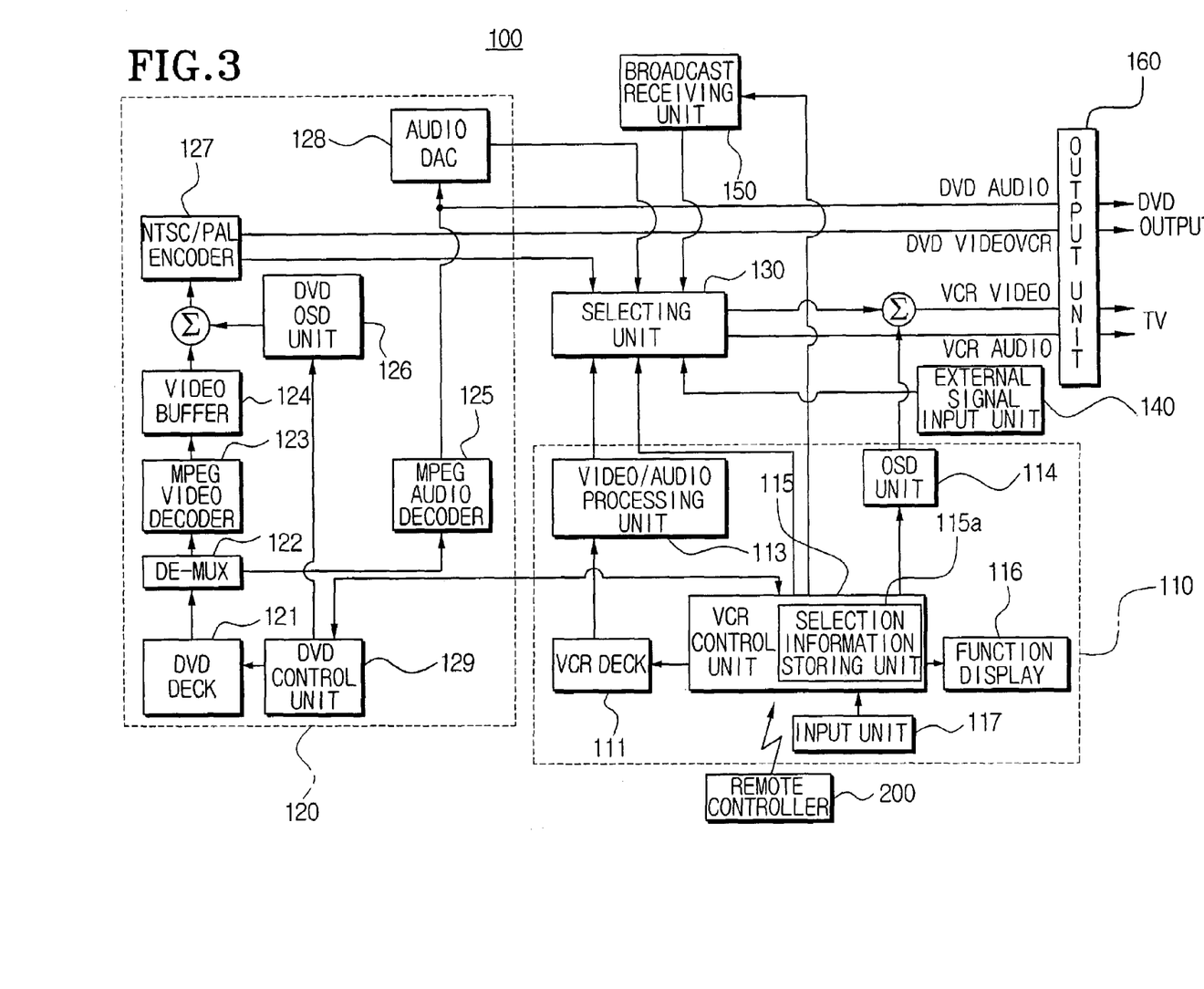
FIG. 3 is a block diagram of an example of a combined DVDP/VCR system according to an embodiment of the present invention.

FIG. 3 is a block diagram of an example of a combined DVDP/VCR system 100 according to one example of the present invention. As shown, the combined DVDP/VCR system 100 includes a DVDP unit 120 and a VCR unit 110.

Specifically, the combined DVDP/VCR system 100 includes a VCR unit 110 for performing functions of a VCR, a DVD unit 120 for performing functions of a DVDP, an external signal input unit 140 for inputting signals from the external devices such as a camcorder, a broadcast receiving unit 150 for receiving a broadcast signal, a selecting unit 130 for a selecting among, inter alia, the signals input from the broadcast receiving unit 150 and external signal input unit 140, and an output unit 160 for providing peripherals, such as a television or amplifier, with the signals output from the VCR unit 110 and the DVDP unit 120.

The VCR unit 110 includes a VCR deck 111, a video/audio processing unit 113, an on-screen display unit (OSD) 114, a VCR control unit 115, a display 116, an input unit 117, and a remote controller 200 for inputting control commands from a remote area.

The VCR deck 111 operates to record data onto a magnetic tape, or to read the recorded data from the magnetic tape. When the magnetic tape is inserted in the VCR deck 111, the VCR control unit 115 switches the VCR unit 110 into the play mode, thereby reproducing signals from the magnetic tape inserted in the VCR deck 111.

The video/audio processing unit 113 processes the video/audio signals reproduced in the VCR deck 111 into a predetermined signal, and outputs the processed signal. The OSD unit 114 generates signals, such as subtitle signals and a selection menu, on an OSD screen. The VCR control unit 115 controls the overall operation of the VCR unit 110, and has a selection information storing unit 115a.

The VCR control unit 115 receives from the DVD control unit 129 the information about the operational status and environment setting of the DVDP unit 120. The transmission/reception of the information is made under a predetermined communication protocol with the power of the combined DVDP/VCR system on.

The selection information storing unit 115a stores the selection information about whether the reproduced signal selected by the selecting unit 130 under the control signal of the VCR control unit 115 is from the VCR unit 110 or from the DVDP unit 120. Operational commands of the user are input through the input unit 117 and the remote controller 200, and the operational mode and environment setting mode for the VCR unit 110 and the DVDP unit 120 are displayed through the display 116 for the user's notice.

The DVDP unit 120 includes a DVD deck 121, a DEMUX 122, a video decoder 123, a video buffer 124, an audio decoder 125, a DVD OSD unit 126, an encoder 127, an audio D/A 128 and a DVD control unit 129. Usually, all these components are constructed as a single component, except for the DVD control unit 129 and the DVD deck 121.

The DVD deck 121 reads the data recorded in the DVD. When the DVD is loaded n the DVD deck 111 and the deck 111 is inserted in the DVDP deck 121, the DVD control unit 115 switches the DVD unit 120 to the play mode, thereby reproducing the data from the DVD in the DVD deck 111.

The DE-MUX 122 outputs the data read from the DVD deck 121 as the video signal and the audio signal separately. The video decoder 124 and the audio decoder 125 decode the compressed video/audio signals to restore the signals into original digital video/audio signal, and the video buffer 124 stores the video data in a predetermined amount, which will generally construct one frame screen. The encoder 127 converts the digital video signal into an analog television image signal, and outputs a component video signal comprising a complex image signal, super video signal and YCbCr.

The audio D/A 128 converts the digital audio signal output from the audio decoder 125 into an analog audio signal and outputs the converted analogue audio signal. The DVD OSD unit 126 stores text data and figures overlapped with the DVD screen, and performs the OSD functions. The DVD control unit 129 controls the overall operation of the DVDP unit 120, and transmits to the VCR control unit 115 the information about the operational status and environment setting status of the DVDP unit 120.

The output unit 160 receives the signal output from the DVD encoder 124, the selecting unit 130 and the OSD unit 114, and outputs the input signal as a DVD video, DVD audio, VCR video and a VCR audio signal. The output unit 160 is connected to peripherals such as a television and audio system, which output the video and audio respectively.

The external signal input unit 140 is connected to the selecting unit 130, which functions to transmit the externally-input signal to the selecting unit 130. The signal output terminals of the external devices, such as a camcorder, are connected to the external signal input unit 140. The broadcast receiving unit 150 is also connected to the selecting unit 130, and receives the broadcasting signal from the broadcasting station and transmits the received broadcasting signal to the selecting unit 130. Accordingly, the signals of the external devices and broadcasting signals can be transmitted to the combined DVDP/CR system 100 through the external signal input unit 140 and the broadcast receiving unit 150, respectively, while the signals of the external devices and broadcasting signals can also be recorded onto the magnetic tape or reproduced through the television or a monitor by using the VCR unit 110.

The method for controlling the operation of the combined DVDP/VCR system 100 according to an embodiment of the present invention will be described below in greater detail.

Figure 4:
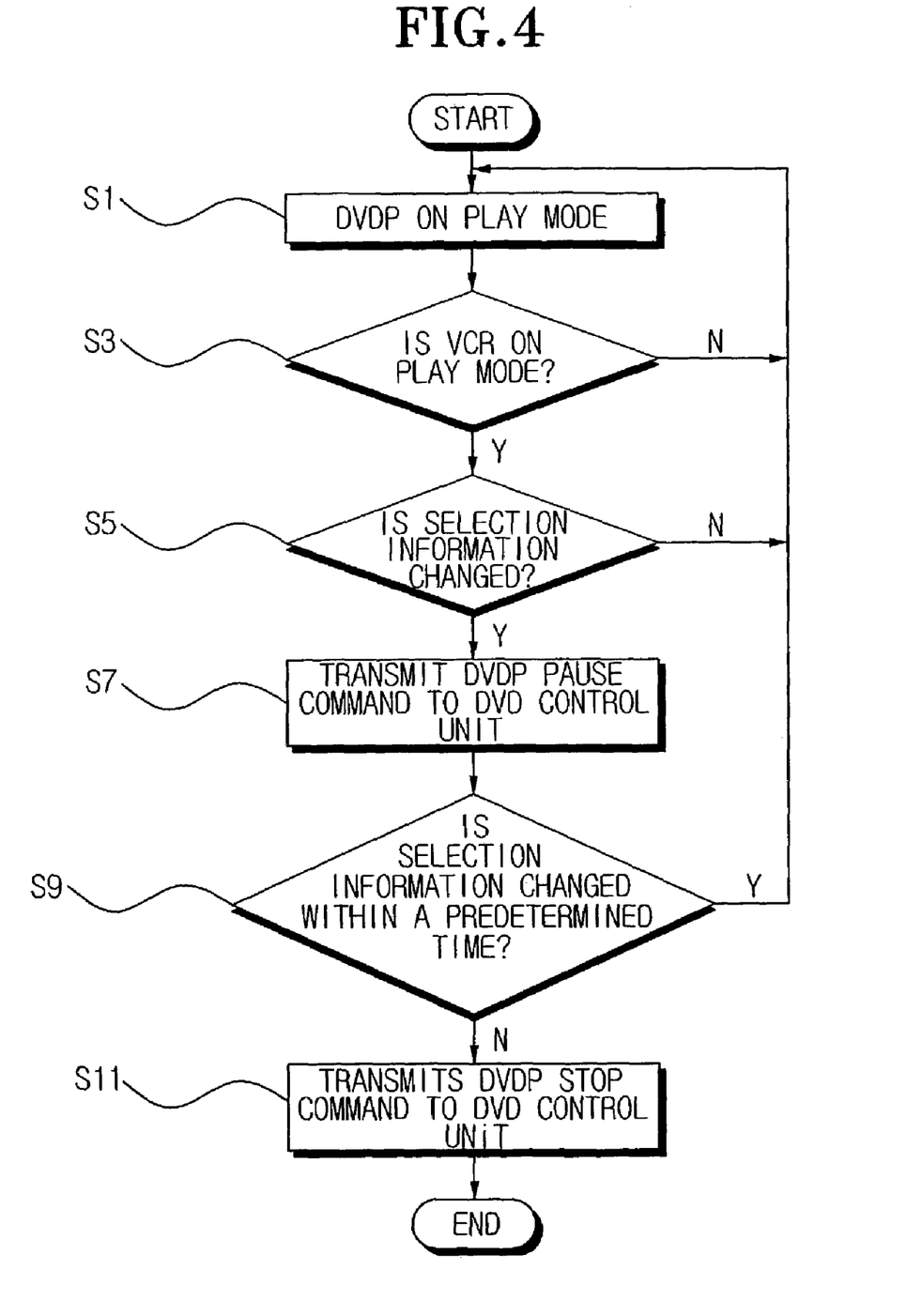
FIG. 4 is a flowchart showing an example of a method for controlling the operation of the combined DVDP/VCR system shown in FIG. 3.

FIG. 4 is a flowchart showing the method for controlling the operation of the combined DVDP/VCR system 100 according to an preferred embodiment of the present invention.

When the user inputs the reproducing command for the DVDP unit 120 through the input unit 117 and the remote controller 200, or when the DVD is loaded/inserted in the DVD deck 121, the DVDP unit 120 is switched to the play mode in step S1. When the DVD control unit 129 transmits information to the VCR control unit 115 indicating that the DVDP unit 120 is in the play mode, the VCR control unit 115 controls the selecting unit 130 to select the reproduced signals, that is, the video/audio signals, from the DVDP unit 120 and to input the selected signals to the output unit 160. At the same time, the VCR control unit 115 stores the selection information about the DVDP unit 120 that outputs the reproduced signals selected by the current selecting unit 130 in the selection information storing unit 115*a*.

When the video tape is inserted into the VCR deck 111 during the reproducing operation (step S1) of the DVDP unit 120 of the combined DVDP/VCR system 100, the VCR control unit 115 recognizes the insertion of the video tape into the VCR deck 111, and switches the VCR unit 110 to the play mode in step S3. The VCR unit 110 can also be switched to the play mode by the user's input of the VCR reproducing command through the input unit 117 and the remote controller 200.

Accordingly, the VCR control unit 115 provides an appropriate control signal which controls the selecting unit 130 to select the reproduced signal of the VCR unit 110 instead of the reproduced signal of the DVDP unit 120. At the same time, the VCR the selection information storing unit 115*a* of the control unit 115 stores selection information indicating the selection of the VCR unit 110 by the selecting unit 130. The VCR control unit 115 checks the selection information storing unit 115*a* and determines whether the stored selection information has changed or not in step S5.

When the VCR control unit 115 determines that the stored selection information has changed from the DVDP unit 120 to the VCR unit 110, the VCR control unit 115 transmits a pause command to the DVD control unit 129, to switch the operation of the DVDP unit 120 to the pause mode in step S9. Although the mode is switched to the pause mode in this embodiment as an example, the mode can be also switched to the stop mode.

When it is determined that there is no change in the selection information stored in the selection information storing unit 115*a* for a predetermined time, for example, when there is no mode switching caused by a stop command given to the VCR unit 110 (or ejection of video tape) and a reproducing command given to the DVDP unit 120 (or insertion of DVD into the DVD deck), the VCR control unit 115 in step S11 transmits the stop command to the DVD control unit 129 so as to completely stop the DVDP unit 120 which was in the pause mode.

In this example, the DVDP unit 120 is in the pause mode before it is switched to the stop mode, in case there is a need to switch the DVDP unit 120 to the play mode for a brief searching of the video/audio signals of the DVDP unit 120 and VCR unit 110 that have not been output, for reasons such as setting the environment of the system, and so on.

Accordingly, the DVD control unit 129 switches the operational mode of the DVDP unit 120 in response to the control command transmitted from the VCR control unit 115.

The above description provides an example of a method of mode switching caused by the insertion of the recording medium in the selected deck 111 or 121, and a method of switching the unselected reproducing apparatus to a pause mode and a stop mode when the selected reproducing device is switched to the play mode in response to the reproducing command input from the user through the input unit 117.

Figure 5:
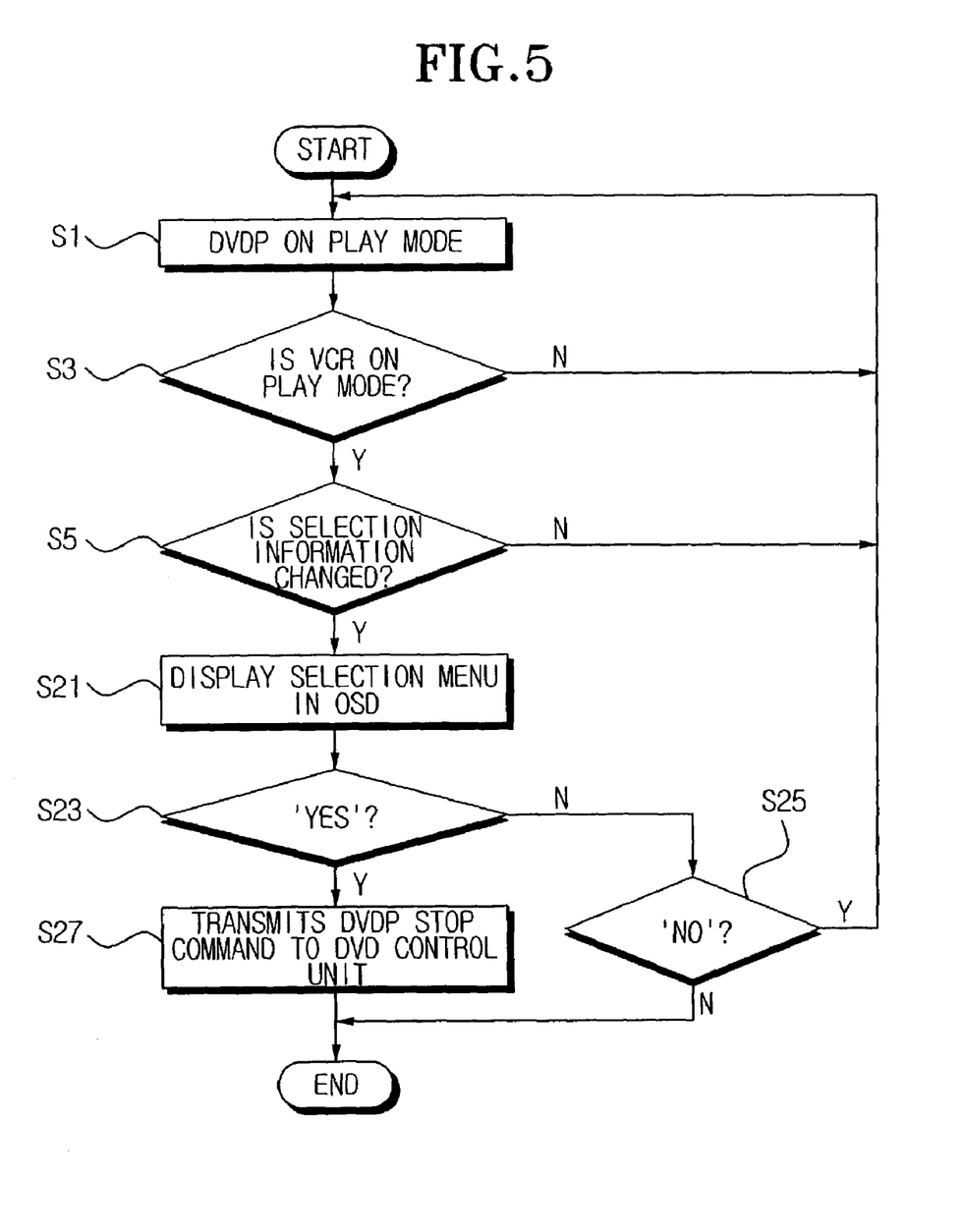
FIG. 5 is a flowchart showing an example of a method for controlling the operation of the combined DVDP/VCR system shown in FIG. 3 according to another embodiment of the present invention.

FIG. 5 shows a method for controlling the operation of the combined DVDP/VCR system according to another example of an embodiment of the present invention. In this example, the reproducing device, which is not selected during a manual selection, is switched to the pause mode and the stop mode.

Through steps S1 through S5 of FIG. 4, and in step S5 in particular, the VCR control unit 115 determines that the selection information stored in the selection information storing unit 115*a* has changed to indicate that the selecting unit 130 has stopped selecting the reproduced signals of the DVDP unit 120 and has begun selecting the reproduced signals of the VCR unit 110. As indicated in step S21 of FIG. 5, the VCR control unit 115 displays a certain selection menu on the screen 300 through the OSD unit 114 as shown in FIG. 6, to allow for selection of an operational mode of the DVDP unit 120.

Figure 6:
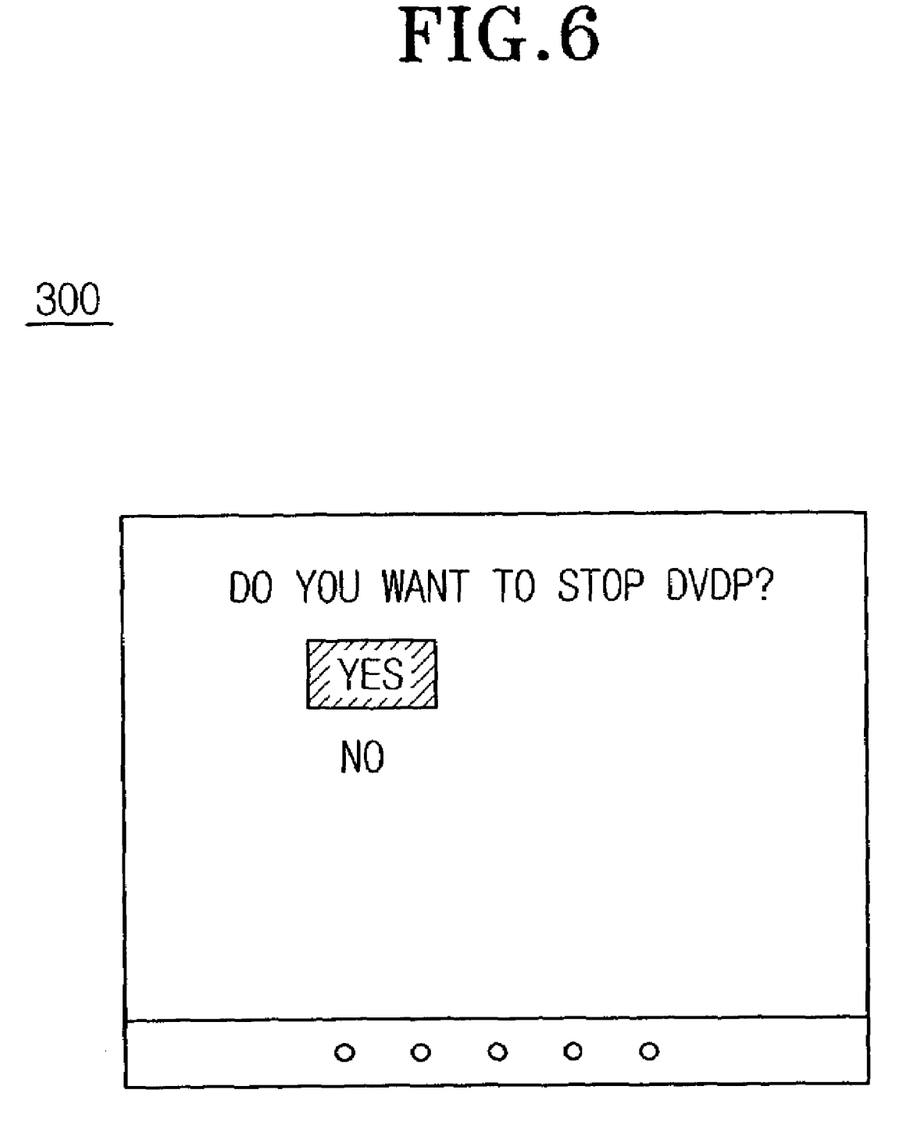
FIG. 6 is a view showing an example of a selection menu displayed on a screen according to the operation controlling method shown in FIG. 5.

As shown in FIG. 6, in response to the query, "DO YOU WANT TO STOP DVDP?", the user selects 'YES' (Step S23 of FIG. 5) or 'NO' (Step S25 of FIG. 5). When the 'YES' is selected, the VCR control unit 115 transmits the stop command to the DVD control unit 129 in step S27, to switch the DVDP unit 120 to the stop mode. However, in order to switch the VCR unit 110 back to the play mode to search the recorded contents in the video tape, the user selects the 'NO' selection in step S25.

As described above, the VCR unit 110 is switched to the play mode during the reproducing operation of the DVDP unit 120, and vice versa. By switching the operation of the apparatus not in operation to the pause mode and stop mode, automatically or manually, the combination system having a plurality of reproducing apparatuses has improved operability, while also reducing unnecessary power consumption which is caused due to the unnecessary operation of the reproducing apparatus.

According to the embodiment of the present invention described above, in the combined system of the DVDP unit 120 and the VCR unit 110 for the reproducing operation, the DVDP unit 120 or the VCR unit 110 that is not operating is switched to the pause mode or the stop mode, automatically or manually. As a result, the operability of the system is improved, while the waste of power consumption is prevented.

Although an embodiment of the present invention has been described above, it will be understood by those skilled in the art that the present invention should not be limited to the described embodiment, but various changes and modifications can be made within the spirit and scope of the present invention as defined by the appended claims.

What is claimed is:

1. A combination system comprising a plurality of reproducing apparatuses, the combination system comprising:
   a selecting unit, adapted to select a reproduced signal from one of the plurality of reproducing apparatuses that is switched to a play mode;
   a selection information storing unit, adapted to store selection information identifying the one reproducing apparatus that outputs the reproduced signal selected by the selecting unit; and
   a control unit, adapted to control the one reproducing apparatus to switch to a pause mode or a stop mode when the selection information changes from identifying the one reproducing apparatus to identifying another reproducing apparatus of the plurality of reproducing apparatuses.

2. The combination system of claim 1, wherein the control unit is further adapted to control the one reproducing apparatus in the pause mode to switch to the play mode when the selection information stored in the selection information storing unit is not changed for a predetermined time period.

3. The combination system of claim 1, further comprising:
   an input unit, adapted to input a selection command;
   wherein the control unit is further adapted to control at least one of said reproducing apparatuses to switch to a play mode in response to at least one of insertion of a recording medium into said at least one of said reproducing apparatuses and an input of a play mode control signal via the input unit.

4. The combination system of claim 1, wherein the plurality of reproducing apparatuses comprises a digital versatile disk player (DVDP) for reproducing recorded data in a digital versatile disk (DVD), and a videocassette recorder (VCR) for reproducing recorded data in a magnetic tape.

5. The combination system of claim 4, wherein the VCR comprises the control unit.

6. The combination system of claim 4, wherein the control unit is further adapted to transmit a control signal to a DVD control unit to control an operation of the DVDP so that the operational mode of the DVDP is switched to the pause mode or the stop mode when the one of the plurality of reproducing apparatuses comprises the DVDP.

7. The combination system of claim 1, further comprising:
   an on-screen display (OSD) unit, adapted to generate a selection menu pertaining to an operational mode of the one of the plurality of reproducing apparatuses;
   wherein the control unit is further adapted to receive a selection command made by a user via the selection menu, and to control the operational mode of the one of the plurality of reproducing apparatuses to change in response to the selection command, when the selection information stored in the selection information storing unit is changed from identifying the one of the plurality of reproducing apparatuses to identifying another of the plurality of reproducing apparatuses.

8. The combination system of claim 7, wherein the control unit is further adapted to transmit a control command to a digital versatile disk player (DVDP) control unit so that the operational mode of the one of the plurality of reproducing apparatuses comprising a DVDP, is switched in response to the selection command made by the user via the selection menu.

9. A method for controlling an operation of a combination system comprising a plurality of reproducing apparatuses, the method comprising:
   selecting a reproduced signal from one of the plurality of reproducing apparatuses that is switched to a play mode;
   storing selection information identifying the one of the plurality of apparatuses that outputs the selected reproduced signal; and
   controlling the one of the plurality of reproducing apparatuses to switch to either a pause mode or a stop mode when the selection information changes from the one of the plurality of reproducing apparatuses to another of the plurality of reproducing apparatuses.

10. The method of claim 9, wherein the controlling step comprises controlling the one of the plurality of reproducing apparatuses to switch from the pause mode to the stop mode when the stored selection information is not changed for a predetermined time period.

11. The method of claim 9, further comprising:
    switching at least one of said reproducing apparatuses to a play mode in response to at least one of insertion of a recording medium into said at least one of said reproducing apparatuses and an input of a play mode control signal via an input unit.

12. The method of claim 9, wherein:
    the plurality of reproducing apparatuses comprises a digital versatile disk player (DVDP) for reproducing recorded data in a digital versatile disk (DVD), and a videocassette recorder (VCR) for reproducing recorded data in a magnetic tape; and the selecting, storing and controlling steps are performed with regard to the DVDP and VCR.

13. The method of claim 12, wherein:
the VCR comprises a control unit; and
the controlling step comprises performing the controlling by the control unit.

14. The method of claim 12, wherein the controlling step comprises transmitting a control command to a DVDP control unit so that the operational mode of the DVDP is switched to the pause mode or to the stop mode when the one of the plurality of reproducing apparatuses comprises the DVDP.

15. The method of claim 9, further comprising:
displaying a selection menu pertaining to an operational mode of the one of the plurality of reproducing apparatuses on an on-screen display (OSD);
wherein the controlling step comprises receiving the selection command made by a user via the selection menu, and controlling the operational mode of the one of the plurality of reproducing apparatuses to switch in response to the selection command when the selection information stored in the selection information storing unit changes from identifying the one of the plurality of reproducing apparatuses to identifying another of the plurality of reproducing apparatuses.

16. The method of claim 15, wherein the controlling step further comprises transmitting a control command to a digital versatile disk player (DVDP) control unit so that the operational mode of the one of the plurality of reproducing apparatuses comprising a DVDP is switched in response to the selection command made by the user via the selection menu.

* * * * *

UNITED STATES PATENT AND TRADEMARK OFFICE
CERTIFICATE OF CORRECTION

PATENT NO. : 7,136,569 B2  
APPLICATION NO. : 10/389900  
DATED : November 14, 2006  
INVENTOR(S) : Byung-hyuk Cho Page 1 of 1

It is certified that error appears in the above-identified patent and that said Letters Patent is hereby corrected as shown below:

In the title page:

TITLE PAGE (73) Assignee: SHOULD READ Samsung Electronics Co., LTD

TITLE PAGE (74) Attorney, Agent or Firm SHOULD READ - Roylance, Abrams, Berdo & Goodman, L.L.P.

Signed and Sealed this

Thirtieth Day of January, 2007

JON W. DUDAS  
*Director of the United States Patent and Trademark Office*